United States Patent
Childress et al.

(10) Patent No.: US 9,144,960 B2
(45) Date of Patent: Sep. 29, 2015

(54) LAMINATE COMPACTION USING MAGNETIC FORCE

(71) Applicant: The Boeing Company, Chicago, IL (US)

(72) Inventors: James J. Childress, Mercer Island, WA (US); Alan W. Baker, Sammamish, WA (US); Mark Klewiada, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 109 days.

(21) Appl. No.: 13/762,024

(22) Filed: Feb. 7, 2013

(65) Prior Publication Data

US 2014/0216642 A1    Aug. 7, 2014

(51) Int. Cl.
| | |
|---|---|
| *B32B 37/10* | (2006.01) |
| *B29C 70/42* | (2006.01) |
| *B29C 43/36* | (2006.01) |
| *B29C 43/20* | (2006.01) |
| *B29L 31/00* | (2006.01) |
| *B29C 43/32* | (2006.01) |

(52) U.S. Cl.
CPC .............. *B32B 37/10* (2013.01); *B29C 43/203* (2013.01); *B29C 43/36* (2013.01); *B29C 70/42* (2013.01); *B29C 2043/3211* (2013.01); *B29C 2043/3613* (2013.01); *B29L 2031/003* (2013.01)

(58) Field of Classification Search
CPC ........ B32B 37/10; B29C 70/42; B29C 43/36; B29C 43/203
USPC .................................. 156/272.2, 379.6
See application file for complete search history.

(56) References Cited

U.S. PATENT DOCUMENTS

| | | | | |
|---|---|---|---|---|
| 1,603,175 | A * | 10/1926 | Weisz | ............... 15/220.2 |
| 3,686,815 | A | 8/1972 | Von Bose | |
| 3,700,938 | A | 10/1972 | Bryant | |
| 5,939,007 | A | 8/1999 | Iszczyszyn et al. | |
| 6,489,871 | B1 * | 12/2002 | Barton | ................ 335/285 |
| 7,148,776 | B2 | 12/2006 | Day et al. | |
| 7,496,424 | B2 | 2/2009 | Froeschner et al. | |
| 2004/0065409 | A1 | 4/2004 | Lindsay et al. | |
| 2011/0006460 | A1 * | 1/2011 | Vander Wel et al. | ........ 264/403 |
| 2011/0018182 | A1 | 1/2011 | Day et al. | |

FOREIGN PATENT DOCUMENTS

| | | |
|---|---|---|
| EP | 1134069 A1 | 9/2001 |
| SU | 1017508 A * | 5/1983 |
| WO | 2011032865 A1 | 3/2011 |

OTHER PUBLICATIONS

International Search Report and Written Opinion, dated Apr. 22, 2014, regarding Application No. PCT/US2014/010211, 10 pages.

* cited by examiner

*Primary Examiner* — Daniel McNally
(74) *Attorney, Agent, or Firm* — Yee & Associates, P.C.

(57) ABSTRACT

A device uses magnetic force generated by a magnet to intensify compaction pressure applied to a composite laminate.

12 Claims, 6 Drawing Sheets

LAMINATE COMPACTION USING MAGNETIC FORCE

BACKGROUND INFORMATION

1. Field

The present disclosure generally relates to the fabrication of composite parts, and deals more particularly with a method and device for compacting composite plies against a tool.

2. Background

Composite parts comprising fiber reinforced polymer resins may be fabricated using any of several techniques. In one technique, a multi-ply, fiber pre-preg charge is laid up and drape formed over a tool, following which the formed charge is compacted and cured. In another technique, a dry fiber pre-form is placed in a mold, vacuum bagged and then infused with resin to produce the desired part shape. The resin infused pre-form is then cured using autoclave or out-of-autoclave processes.

Depending on the fabrication technique used and the geometry of the part, achieving adequate compaction of the formed composite charge may present challenges. For example, bridging of the vacuum bag over some areas of the charge may prevent full compaction pressure from being applied to these areas. Similarly, where the forming tool has features, such as relatively sharp inside corners, it may be difficult to fully form a multi-ply charge into these the corners. When the resin infusion technique is used, compaction pressure applied to the fiber pre-form may be lost as the resin is being introduced. Regardless of the fabrication technique, the application of inadequate compaction pressure may result in the finished part exhibiting resin rich zones that have less than a desired fiber fraction, potentially affecting part performance.

Pressure intensifiers had been developed to intensify the amount of compaction pressure that is applied to local areas of a composite charge, but each has limitations. For example, threaded clamp-type intensifiers lose force as the charge moves (compacts) during the compaction process. Similarly, pressure intensifiers that rely on spring forces move only in two directions as the charge is moves. In some applications, tool or part geometries may prohibit the use of known pressure intensifiers.

Accordingly, there is a need for a device and a method of locally intensifying compaction pressure applied to a formed composite charge. There is also a need for a device and method of the type mentioned above that is simple, easy to use and is adapted to move along with the part charge during compaction in order to maintain a desired, constant compaction pressure.

SUMMARY

The disclosed embodiments provide magnetic pressure intensifier device which may be used to locally intensify compaction pressure applied to a formed, composite laminate charge using the magnetic force supplied by one or more magnets. The amount of magnetic force, and thus the level of compaction pressure, may be adjusted by changing the position of the magnet on the device. The device applies constant compaction pressure throughout de-bulking, compaction or curing, and moves in any of three dimensions along with the charge as it is being compacted. The device is simple in construction, easily installed and is compatible with existing composite laminate fabrication processes. The device is effective in reducing bridging and increasing fiber fraction in areas of the part having a tight radius. The device may also be used to hold parts in a fixture during assembly.

According to one disclosed embodiment, a device is provided for compressing composite plies against a tool. The device comprises a body adapted to be placed against the plies, and at least one magnet on the body adapted to generate a magnetic force that compresses the plies against the tool. The tool is formed of a ferromagnetic material and the body includes paramagnetic material. The magnet may be mounted on the body to allow adjustment of the magnetic force. The body includes a face formed of paramagnetic material, the face being adapted to engage and compress the composite plies into a corner of the tool. The magnet is spaced from the paramagnetic member by a gap, and the size of the gap between the magnet and the paramagnetic member is adjustable. The magnet may be one of a Neodymium magnet and a Samarium Cobalt magnet.

According to another embodiment, a device is provided for applying a local compaction force against a composite part. The device comprises a paramagnetic member adapted to apply pressure to the part using a magnetic force, and a magnet magnetically coupled with the paramagnetic member for generating the magnetic force. The device may further comprise a body, wherein the paramagnetic member and the magnet are mounted on the body. The paramagnetic member and the magnet are spaced apart from each other. The paramagnetic member includes a face configured to form a radius in the composite part. The magnet is adjustable to allow adjustment of the magnetic force.

According to a further embodiment, a device is provided for intensifying compaction pressure applied to a corner of a composite laminate part. The device comprises a body having a face configured to substantially match the shape of the corner, and at least one magnet on the body, the magnet being magnetically coupled with the face for magnetizing the face. The body includes a paramagnetic member, and the face is located on the paramagnetic member. The magnet and the paramagnetic member are spaced apart from each other to form a gap therebetween, and the magnet is movably mounted on the body to allow adjustment of the size of the gap.

According to still another embodiment, a method is provided of compacting a composite part, comprising placing a magnetizable device on the part, and using magnetic force draw the device against the part. The method further comprises adjusting the magnetic force by adjusting the position of a magnet on the device. Placing a magnetizable device on the part includes bringing a face of the device into contact with an area of the part.

According to a further disclosed embodiment, a method is provided of intensifying compaction pressure applied to a radiused corner of a composite laminate. The method comprises placing a magnetic force intensifier against the composite laminate at the radiused corner, and using a magnetic field generated by the magnetic intensifier to force the magnetic intensifier against the composite laminate at the radiused corner.

According to still another embodiment, a method is provided of forming a composite laminate having a radiused interior corner, comprising placing a composite laminate charge over a forming tool, forming the composite laminate over the forming tool, including using a compaction pressure to compact the composite laminate into a radiused interior corner of the tool, and using a magnetic force to intensify compaction pressure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
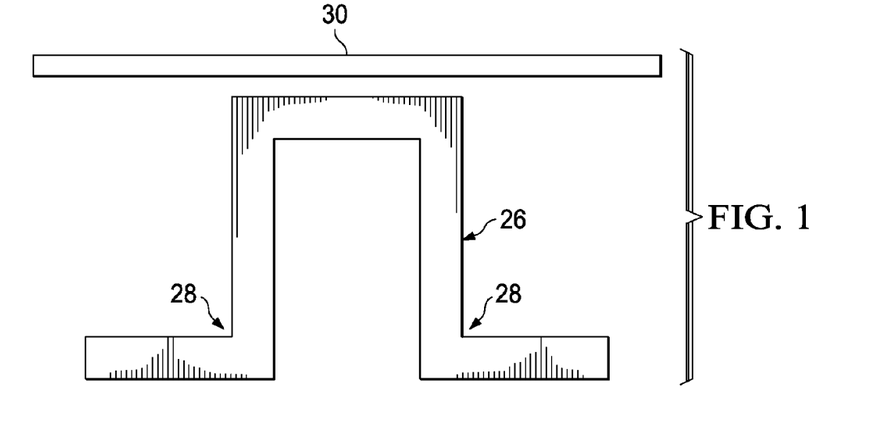
FIG. 1 is an illustration of an end view of a composite laminate charge about to be formed down onto a forming tool.
Figure 2:
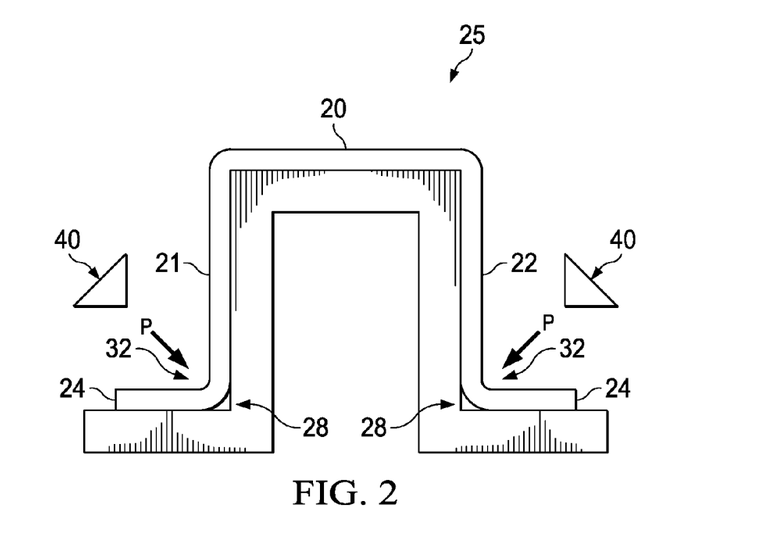
FIG. 2 is an illustration similar to FIG. 1, but showing the composite laminate charge having been formed over the forming tool.
Figure 3:
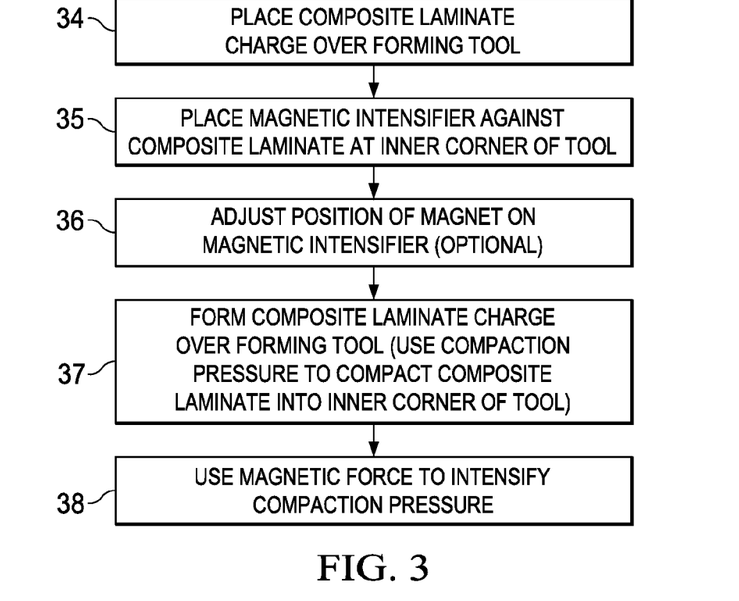
FIG. 3 is an illustration of a flow diagram of a method of compacting a composite laminate charge using the disclosed magnetic pressure intensifier.

Referring first to FIGS. 1, 2 and 3, a multi-ply uncured composite laminate charge 30 may be formed over a male tool 26. The charge 30 may comprise a layup of pre-preg, however as will be discussed later the charge 30 may comprise a dry fiber preform that is subsequently infused with resin within a mold (not shown). In the example shown in FIGS. 1 and 2, the formed part is a hat-shaped stringer 25 (FIG. 2), comprising three legs 20, 21, 22 and a pair of outwardly turned flanges 24. Each of the flanges 24 transitions to one of the legs 21, 22 through an inner radius 32 which is formed within a 90° inside corner 28 of the tool 26. In order to form each inner radius 32 into an inside corner 28, a compaction pressure P is applied to the laminate charge 30 at the inside corners 28. As will be described in more detail below, in accordance with the disclosed embodiments, the necessary compaction pressure P is applied using a magnetic force generated by a magnetic pressure intensifier device 40.

FIG. 3 illustrates the overall steps of a method of fabricating a composite laminate part, such as the stringer 25 shown in FIG. 2, using the magnetic pressure intensifier device 40 to locally intensify the compaction pressure in desired areas, such as an inside corner 28 of the tool 26. Beginning at step 34, a composite laminate charge 30 is placed over a forming tool 26. At 35, the magnetic intensifier device 40 is placed against the inside corner 28 of the tool 26, and at step 36, optionally, the position of a magnet 44 on the device 40 may be adjusted to achieve a desired intensification of the compaction pressure at the inside corner 28. At step 37, the composite laminate charge 30 is formed over the forming tool 26. The formed laminate charge 30 is compacted against the tool 26, and compaction pressure is applied at the inner radius 32 in order to form the composite charge into the inside corner 28 of the tool 26. At 38, magnetic force generated by the magnet 44 is used to intensify the compaction pressure P at the inside corner 28 of the tool 26.

Figure 4:
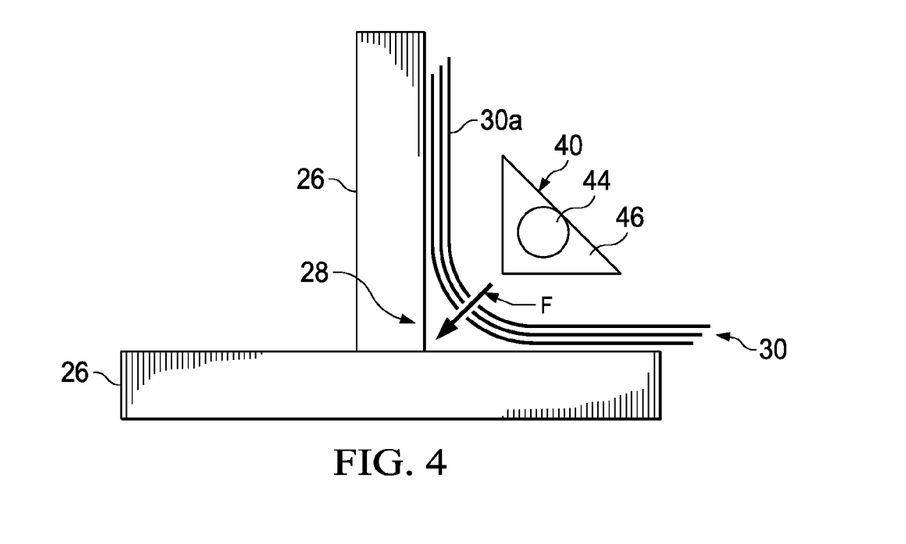
FIG. 4 is an illustration of a diagrammatic end view of a composite laminate charge about to be formed into an inside corner of a forming tool using the magnetic pressure intensifier.
Figure 5:
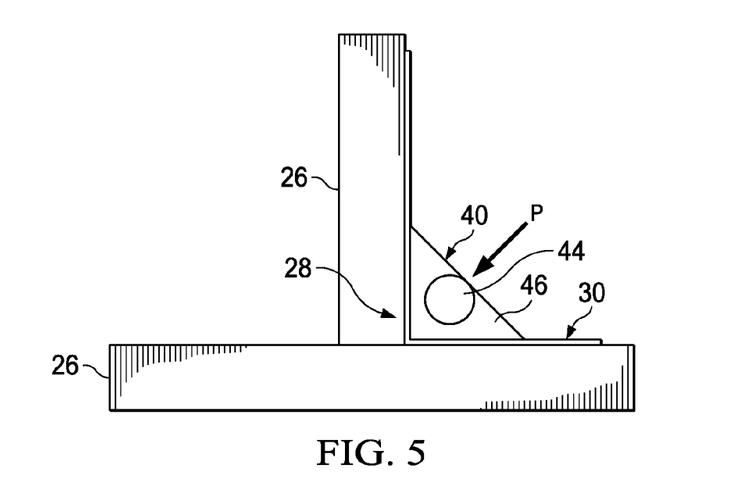
FIG. 5 is an illustration similar to FIG. 4, but showing a composite laminate charge fully formed into the inside corner of the forming tool.

Referring now to FIGS. 4 and 5, a composite laminate charge 30 comprising a plurality of plies 30a is compacted against a tool 26 having an inside corner 28. Although not shown in the drawings, a vacuum bag may be sealed over the composite charge 30 and the tool 26 in order to exert a compaction pressure that compacts the charge against the tool 26. Additional compaction pressure may be applied when an autoclave is used to cure the part. The tool 26 is formed of a magnetic material, i.e. a material having a relatively high magnetic permeability. For example, the tool 26 may be formed of a ferromagnetic material such as Invar or similar nickel-iron alloy. In order to compact the composite laminate charge 30 into the inside corner 28, a magnetic pressure intensifier device 40 is placed against the charge 30 in the area of the inside corner 28.

The device 40 includes a body 46 on which a permanent magnet 44 is mounted. As will be discussed below in more detail, the shape of the body 46 will depend upon the application, and the geometry of the part being formed. In the illustrated example the body 46 has right angle surfaces substantially matching those of the tool 26 at the inside corner 28. The magnet 44 is formed of a magnetic material having a Curie temperature that is suitable for the application, and may depend at least in part, on the temperature at which the composite laminate charge 30 is formed and/or cured. For example and without limitation, the magnet 44 may comprise an SH grade Neodymium magnet or Samaruim Cobalt magnet. SH grade Neodymium magnets may be suitable for use at forming/cure temperatures up to 150° C., while Samaruim Cobalt magnets may be suitable for use at forming/cure temperatures up to 300° C.

The magnet 44 develops an electromagnetic force F which magnetically attracts the ferromagnetic tool 26, causing the device 40 to be drawn toward the tool 26 and compact the laminate charge 30 into the inside corner 28 of the tool 26, as best seen in FIG. 5. As the laminate charge 30 begins to compact against the tool 26, the device 40 moves in one or more (up to three) dimensions along with the laminate charge 30 to maintain intensified compaction pressure P at the inside corner 28. Also, as the laminate charge 30 compacts, the amount of compaction pressure P applied by the device 40 increases because as the magnet 44 draws closer to the tool 26, the magnetic force of attraction between the magnet 44 and the tool 26 increases.

The disclosed magnetic pressure intensifier device 40 may be employed to locally increase the compaction pressure using any of several different processes used to fabricate composite parts. In the examples discussed above, the intensifier device is employed to locally intensify the compaction pressure applied to a pre-preg layup formed to shape using drape forming or similar techniques. In a similar manner, however, the magnetic pressure intensifier device 40 may be employed to maintain local compaction pressure and/or intensify compaction pressure on a dry fiber preform as it is being infused with resin during a resin infusion process. During resin infusion, compaction pressure normally supplied by a vacuum bag is lost because the resin is being infused into a mold containing the preform at or near atmospheric pressure. The magnetic pressure intensifier device 40 maintains the necessary compaction pressure during resin infusion since it relies on magnetic forces, rather than on vacuum pressure, to produce the compaction pressure. The device 40 can be used to achieve de-bulking of composite laminates and to carry out out-of-autoclave curing of composite laminates. The device 40 may also be used to carry out oven curing of composite laminates, with or without vacuum bagging, as well as to hold composite parts in a fixture during assembly processes.

Figure 6:
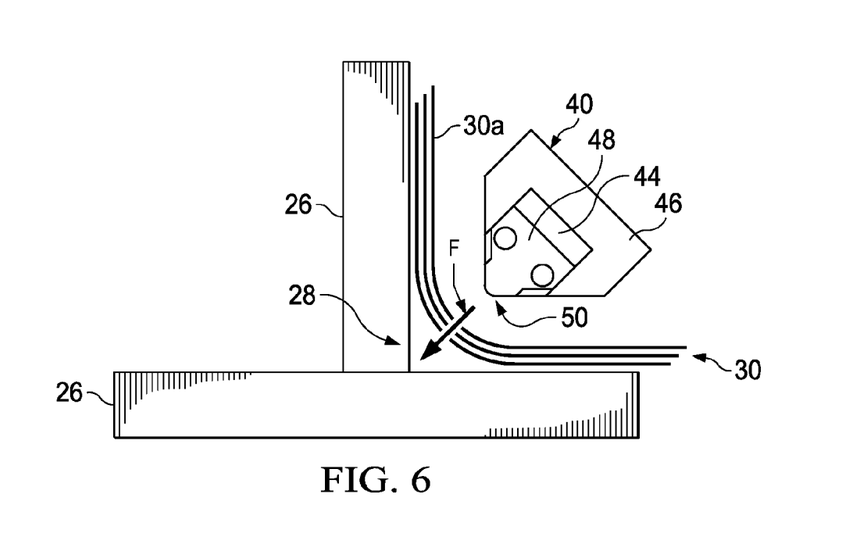
FIG. 6 is an illustration similar to FIG. 4 but showing additional details of the magnetic pressure intensifier.

FIG. 6 illustrates additional details of one embodiment of the magnetic pressure intensifier 40 shown in FIGS. 4 and 5. In this example, the body 46 is formed of a substantially non-magnetic material. A forming member 48 formed of a paramagnetic material is mounted on the body 46 and includes a face 50 having a geometry that is suitable for forming the laminate charge 30 against the tool 26 in a local area, such as at the inside corner 28 of the tool 26. The magnet 44 is mounted on the body 46 in close proximity to the paramagnetic forming member 48 so as to be magnetically coupled with, and magnetize the forming member 48. The magnetic force F generated by the paramagnetic forming member 48 will depend upon its proximity to the magnet 44.

Figure 7:
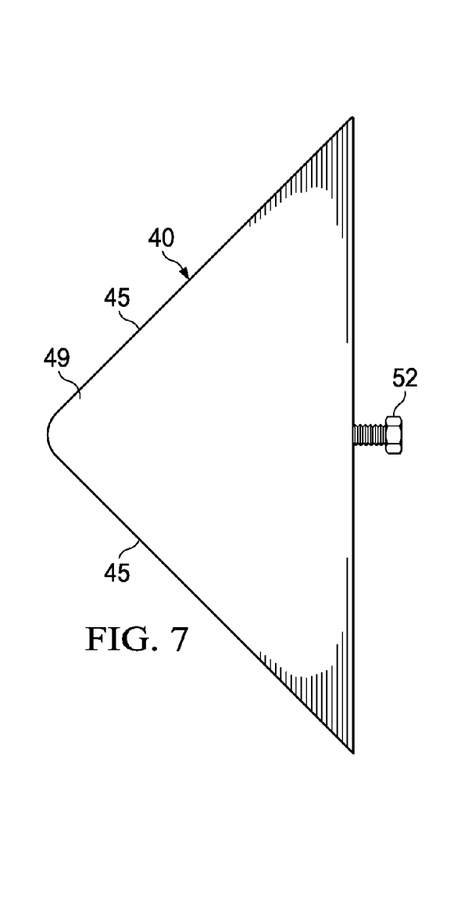
FIG. 7 is an illustration of a side view of an embodiment of the magnetic pressure intensifier.
Figure 8:
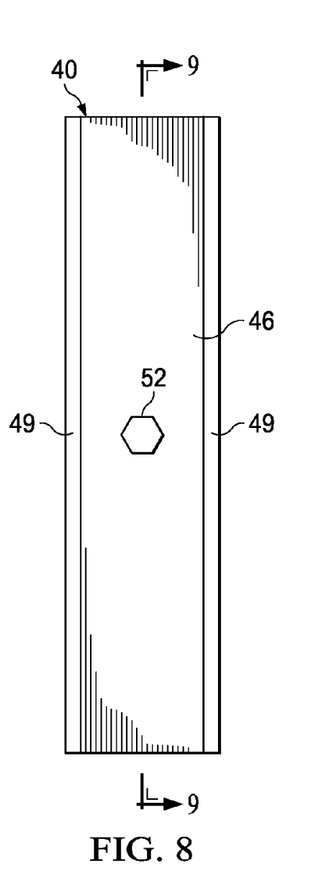
FIG. 8 is an illustration of an end view of the magnetic pressure intensifier shown in FIG. 7.
Figure 9:
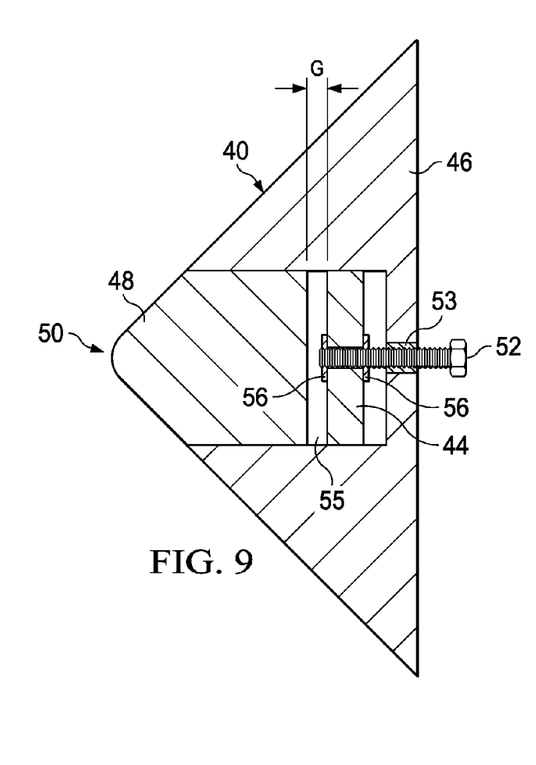
FIG. 9 is an illustration of a sectional view taken along the line 9-9 in FIG. 8.

Attention is now directed to FIGS. 7, 8 and 9 which illustrate additional details of an embodiment of the magnetic pressure intensifier device 40. In this example, the device 40 has a generally triangular shape similar to the devices 40 previously described. A body 46, formed of any suitable non-magnetic material, is sandwiched between a pair of non-magnetic, outer plates 49. The body 46 includes two, generally perpendicular sides 45 adapted to engage and compact the composite charge 30 against the tool 26. A forming member 48 formed of a suitable paramagnetic material is secured within a cavity 55 in the body 46, and includes a face 50 having a slight radius that is adapted to intensify the pressure P used to compact the composite charge 30 into the inside corner 28 of the tool 26. A suitable magnet 44 is also mounted within the cavity 55, in spaced relationship to the forming member 48, forming a gap G between the paramagnetic forming member 48 and the magnet 44. The magnet 44 is displaceable toward and away from the forming member 48 within the cavity 55. An adjustment screw 52 passes through a threaded sleeve 53 in the body 46, and is fastened to the magnet 44 by a pair of retainers 56. Turning the adjustment screw 52 results in displacement of the magnet 44 either toward or away from the forming member 48, in turn changing the size of the gap G. The size of the gap G determines the degree of magnetization of the paramagnetic member 48 by the magnet 44. Thus, the compaction pressure P applied by the device 42 to the composite charge 30 can be altered using the adjustment screw 52.

It should be noted here that in the embodiments described above only a single magnet 44 is employed, however in other embodiments it may be necessary or desirable to use more than one magnet 44 in each device 40.

Figure 10:
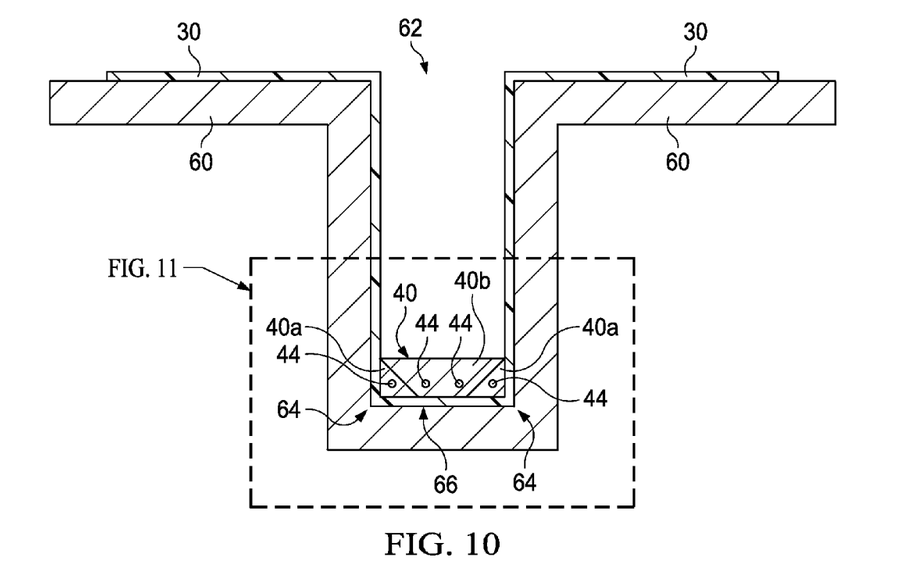
FIG. 10 is an illustration of a cross-sectional view of a forming tool having a composite charge being formed therein and illustrating an alternate embodiment of the magnetic pressure intensifier.
Figure 11:
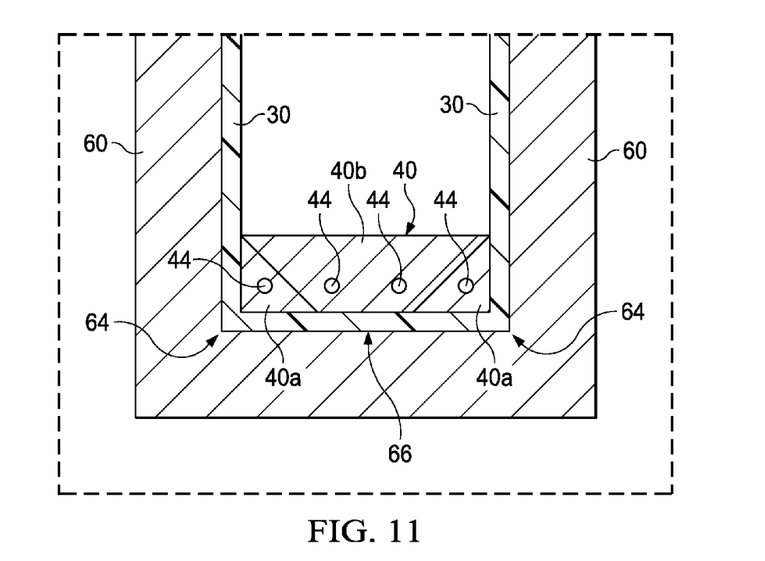
FIG. 11 is an illustration designated as "FIG. 11" in FIG. 10.

In the embodiments described above, the magnetic pressure intensifier device 40 intensifies the compaction pressure applied to the composite charge 30 in a radiused area. However, the device 40 may be employed to apply compaction pressure to the composite charge 30 in areas that may not be radiused, such as substantially flat, straight areas. For example, referring now to FIGS. 10 and 11, a composite charge 30 is formed into a cavity 62 of a female tool 60 formed of a magnetic material such as Invar. The tool 60 includes two inside, spaced apart corners 64 separated by a straight stretch 66. In this example, in order to intensify the compaction pressure applied to the composite charge 30 in all areas of the bottom of the cavity 62, two generally triangular shaped "corner" devices 40a are combined with a trapezoidal shaped center device 40b. The corner devices 40a intensify the compaction pressure applied to the composite charge 30 at the corners 64, while the center device 40b applies compaction pressure to the composite charge 30 along the straight stretch 66.

Figure 12:
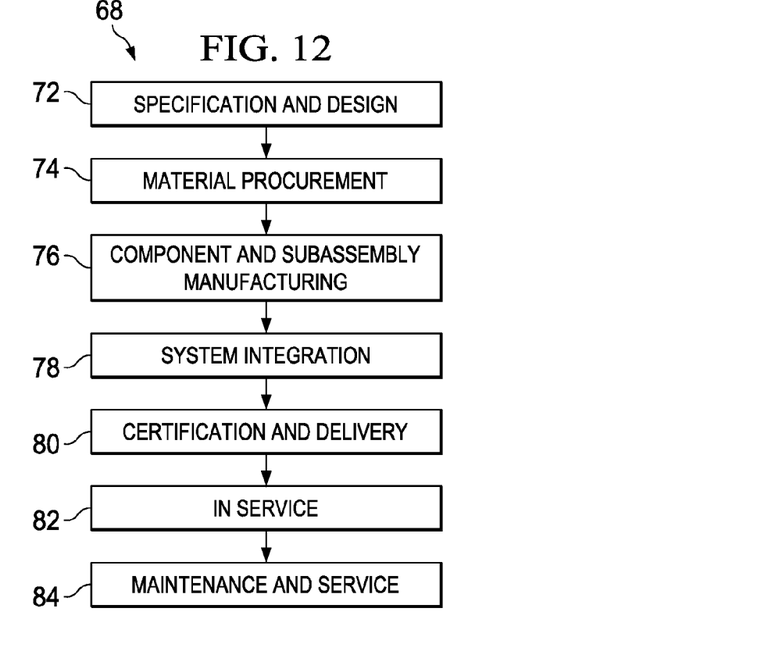
FIG. 12 is an illustration of a flow diagram of aircraft production and service methodology.
Figure 13:
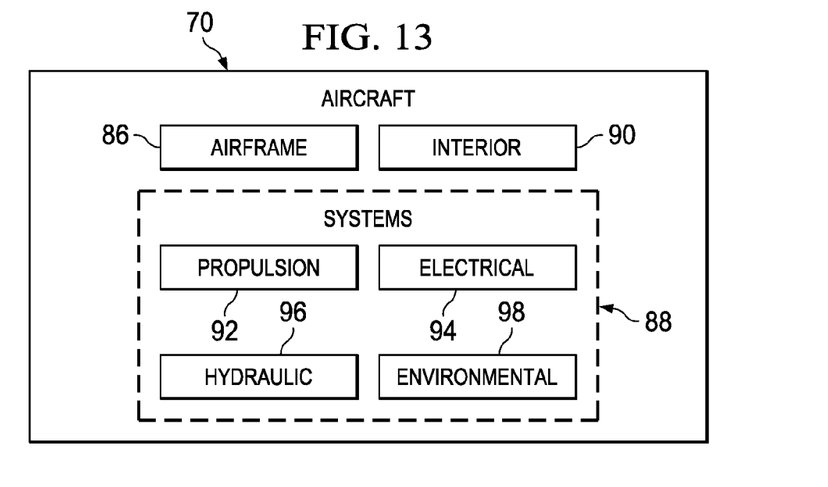
FIG. 13 is illustration of a block diagram of an aircraft.

Embodiments of the disclosure may find use in a variety of potential applications, particularly in the transportation industry, including for example, aerospace, marine, automotive applications and other applications involving compaction of composite laminates during fabrication of composite parts. Thus, referring now to FIGS. 12 and 13, embodiments of the disclosure may be used in the context of an aircraft manufacturing and service method 68 as shown in FIG. 12 and an aircraft 70 as shown in FIG. 13. Aircraft applications of the disclosed embodiments may include, for example, without limitation, stringers, spars, beams and stiffeners to name only a few. During pre-production, exemplary method 68 may include specification and design of the aircraft 70 and material procurement 74. During production, component and subassembly manufacturing 76 and system integration 78 of the aircraft 70 takes place. Thereafter, the aircraft 70 may go through certification and delivery 80 in order to be placed in service 82. While in service by a customer, the aircraft 70 is scheduled for routine maintenance and service 84, which may also include modification, reconfiguration, refurbishment, and so on.

Each of the processes of method 68 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 70 produced by exemplary method 68 may include an airframe 86 with a plurality of systems 88 and an interior 90. Examples of high-level systems 88 include one or more of a propulsion system 92, an electrical system 94, a hydraulic system 96, and an environmental system 98. Any number of other systems may be included. Although an aerospace example is shown, the principles of the disclosure may be applied to other industries, such as the marine and automotive industries.

Systems and methods embodied herein may be employed during any one or more of the stages of the production and service method 68. For example, components or subassemblies corresponding to production process 76 may be fabricated or manufactured in a manner similar to components or subassemblies produced while the aircraft 70 is in service. Also, one or more apparatus embodiments, method embodiments, or a combination thereof may be utilized during the production stages 76 and 78, for example, by substantially expediting assembly of or reducing the cost of an aircraft 70. Similarly, one or more of apparatus embodiments, method embodiments, or a combination thereof may be utilized while the aircraft 70 is in service, for example and without limitation, to maintenance and service 84.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for compressing composite plies, comprising:
   a tool formed of a ferromagnetic material against which a laminate charge is compacted, the tool having at least one inside corner, the laminate charge comprising a number of uncured composite laminate plies;
   a body adapted to be placed against the plies, the body comprising angled surfaces substantially matching the inside corner of the tool, wherein the body includes a paramagnetic material;
   at least one magnet on the body adapted to generate a magnetic force that compresses the plies against the tool; and
   a vacuum bag sealed over the tool, wherein the vacuum bag is configured to exert a first compaction pressure, the first compaction pressure pressing the body toward the inside corner such that the body compacts the laminate charge into the inside corner with a second compaction pressure.

2. The device of claim 1, wherein the angled surfaces of the body further comprises:
   a face formed of paramagnetic material, the face being adapted to be placed against the plies to magnetically compress the composite plies into the inside corner of the tool.

3. The device of claim 2, wherein the magnet further comprises:
   at least one mechanically-adjustable magnet mounted within the body and adjustably spaced from the face by a gap, wherein the at least one magnet is adapted to induce an adjustable magnetic field in the face by adjusting a size of the gap to generate an adjustable magnetic force that compresses the plies between the face and the tool with the second compaction pressure.

4. The device of claim 2, wherein:
   the body is configured to increase the second compaction pressure as the first compaction pressure presses the magnet closer to the tool.

5. The device of claim 1, wherein the magnet is a permanent magnet selected from one of a Neodymium magnet and a Samarium Cobalt magnet.

6. A device for applying a local compaction force against a composite part, comprising:
   a paramagnetic member adapted to apply pressure to the part using an adjustable magnetic force, wherein the paramagnetic member includes a face configured to form a radius in the composite part; and,
   a magnet magnetically adjustably spaced from the paramagnetic member, wherein the magnet is adapted to induce an adjustable magnetic field in the paramagnetic member by adjusting a gap separating the paramagnetic member and the magnet for generating the adjustable magnetic force.

7. The device of claim 6, further comprising:
   a body, and,
   wherein the paramagnetic member and the magnet are mounted on the body.

8. The device of claim 6, wherein the paramagnetic member and the magnet are spaced apart from each other.

9. The device of claim 6, wherein a position of the magnet relative to the paramagnetic member is adjustable to allow adjustment of the magnetic force.

10. A device for intensifying compaction pressure applied to a corner of a composite laminate part, comprising:
    a body having a face configured to substantially match the shape of the corner; and,
    at least one magnet adjustably mounted within the body and adjustably spaced from the face by a gap, the magnet being magnetically coupled with the face for adjustably magnetizing the face by adjusting a size of the gap.

11. The device of claim 10, wherein the body includes a paramagnetic member, and the face is located on the paramagnetic member.

12. The device of claim 10, wherein the magnet is movably mounted on the body to allow adjustment of the size of the gap.

* * * * *